United States Patent
Behnia et al.

(10) Patent No.: US 10,673,625 B1
(45) Date of Patent: Jun. 2, 2020

(54) EFFICIENT IDENTITY-BASED AND CERTIFICATELESS CRYPTOSYSTEMS

(71) Applicants: Rouzbeh Behnia, Tampa, FL (US); Muslum Ozgur Ozmen, Tampa, FL (US); Attila Altay Yavuz, Tampa, FL (US)

(72) Inventors: Rouzbeh Behnia, Tampa, FL (US); Muslum Ozgur Ozmen, Tampa, FL (US); Attila Altay Yavuz, Tampa, FL (US)

(73) Assignee: University of South Florida, Tampa, FL (US)

( * ) Notice: Subject to any disclaimer, the term of this patent is extended or adjusted under 35 U.S.C. 154(b) by 0 days.

(21) Appl. No.: 16/442,467

(22) Filed: Jun. 15, 2019

(51) Int. Cl.
*H04L 9/08* (2006.01)
*H04L 9/30* (2006.01)

(52) U.S. Cl.
CPC .......... *H04L 9/0838* (2013.01); *H04L 9/0861* (2013.01); *H04L 9/0869* (2013.01); *H04L 9/3026* (2013.01); *H04L 9/3033* (2013.01)

(58) Field of Classification Search
CPC ... H04L 9/0838; H04L 9/0861; H04L 9/0869; H04L 9/3026; H04L 9/3033
See application file for complete search history.

(56) References Cited

U.S. PATENT DOCUMENTS

| | | | |
|---|---|---|---|
| 6,230,269 B1 * | 5/2001 | Spies | H04L 9/302 380/279 |
| 8,694,771 B2 * | 4/2014 | Malek | H04L 9/3073 713/155 |

(Continued)

FOREIGN PATENT DOCUMENTS

| | | |
|---|---|---|
| CN | 101702804 | 3/2012 |
| CN | 103023648 | 4/2013 |

(Continued)

OTHER PUBLICATIONS

Tripathi et al. Cryptographic keys generation using identity, Nov. 2011, 3rd International Conference on Advances in Recent Technologies in Communication and Computing, pp. 148-151 (Year: 2011).*

(Continued)

*Primary Examiner* — Kenneth W Chang
(74) *Attorney, Agent, or Firm* — Thomas | Horstemeyer, LLP

(57) ABSTRACT

Disclosed are various embodiments for certificate-free cryptosystems that achieve significant computational and communication efficiency as compared to prior systems. A private key generator (PKG) generates a master public key and a master private key unique to the PKG; receives identifying information for at least one client device; generates a public key for the at least one client device; generates a private key for the at least one client device by: performing a hash of the identifying information using the public key generated for the at least one client device to generate a plurality of indices; identifying values corresponding to the indices from the master private key; and deriving the private key based at least in part on a summation of the values corresponding to the indices; and sends the public key and the private key to the at least one client device.

20 Claims, 10 Drawing Sheets

(56) References Cited

U.S. PATENT DOCUMENTS

| | | | | |
|---|---|---|---|---|
| 2010/0275028 | A1* | 10/2010 | Takashima | H04L 9/3247 713/176 |
| 2011/0173452 | A1* | 7/2011 | Nan | H04L 9/083 713/179 |
| 2012/0250863 | A1* | 10/2012 | Bukshpun | H04L 9/0838 380/278 |

FOREIGN PATENT DOCUMENTS

| | | |
|---|---|---|
| CN | 103297963 | 9/2013 |
| CN | 103905189 | 7/2014 |

OTHER PUBLICATIONS

Sattam S.; et al (2003) "Certificateless Public Key Cryptography." In Advances in Cryptology—ASIACRYPT 2003, Chi-Sung Laih (Ed.). Springer Berlin Heidelberg, pp. 452-473.

O. Arazi; et al (2006) "Load-Balanced Key Establishment Methodologies in Wireless Sensor Networks." International Journal of Security and Networks 1, 3/4, pp. 158-166.

J. Baek; et al (2005) "Certificateless Public Key Encryption Without Pairing." In Information Security, Jianying Zhou, Javier Lopez, Robert H. Deng, and Feng Bao (Eds.). Springer Berlin Heidelberg, pp. 134-148.

R. Behnia; et al (2018) "TACHYON: Fast Signatures from Compact Knapsack." In Proceedings of the 2018 ACM SIGSAC Conference on Computer and Communications Security (CCS '18). ACM, New York, NY, USA, pp. 1855-1867.

R. Behnia; et al (2019) "ARIS: Authentication for Real-Time IoT Systems." In IEEE International Conference on Communications (ICC) (ICC). ACM, New York, NY, USA, pp. 1855-1867.

M. Bellare; et al (2009) "Security Proofs for Identity-Based Identification andaSignature Schemes" Journal of Cryptology 22, 1, pp. 1-61.

D. Boneh; et al (2001) "Identity-Based Encryption from the Weil Pairing." In Advances in Cryptology—CRYPTO, Joe Kilian (Ed.). Springer Berlin Heidelberg, pp. 213-229.

D. Boneh; et al (2007) "Space-Efficient Identity Based EncryptionWithout Pairings." In 48th Annual IEEE Symposium on Foundations of Computer Science (FOCS'07). pp. 647-657.

V. Boyko; et al (1998) "Speeding up Discrete Log and Factoring Based Schemes Via Precomputations." In Advances in Cryptology—EUROCRYPT'98: International Conference on the Theory andApplication of Cryptographic Techniques Espoo, Finland, Proceedings. Springer Berlin Heidelberg, Berlin, Heidelberg, pp. 221-235.

J. Chin; et al (2015) "A Provable Secure Pairing-Free Certificateless Identification Scheme." International Journal of Computer Mathematics 92, 8, pp. 1520-1535.

W. Diffie; et al (1976) "New Directions in Cryptography." IEEE Transactions on Information Theory IT-22, pp. 644-654.

C. Gentry (2003) "Certificate-based Encryption and the Certificate Revocation Problem." In Proceedings of the 22nd International Conference on Theory and Applications of Cryptographic Techniques (EUROCRYPT'03). Springer-Verlag, pp. 272-293.

M. Girault (1991) "Self-Certified Public Keys." In Proceedings of the 14th International Conference on the Theory and Application of Cryptographic Techniques (EUROCRYPT '91). pp. 490-497.

X. Huang; et al (2007) "Certificateless Signature Revisited." In Information Security and Privacy, Josef Pieprzyk, Hossein Ghodosi, and Ed Dawson (Eds.). Springer Berlin Heidelberg, pp. 308-322.

J. Lai; et al (2007) "Self-Generated-Certificate Public Key Encryption Without Pairing." In Public Key Cryptography—PKC 2007, Tatsuaki Okamoto and Xiaoyun Wang (Eds.). Springer Berlin Heidelberg, pp. 476-489.

J. Liu; et al (2008) "Certificate-Based Signature Schemes without Pairings or Random Oracles." In Information Security, Tzong-Chen Wu, Chin-Laung Lei, Vincent Rijmen, and Der-Tsai Lee (Eds.). Springer Berlin Heidelberg, pp. 285-297.

L. Reyzin; et al (2002) "Better than BiBa: Short One-Time Signatures with Fast Signing and Verifying." In Proceedings of the 7th Australian Conference on Information Security and Privacy (ACIPS '02). Springer-Verlag, pp. 144-153.

C. Schnorr (1991) "Efficient Signature Generation by Smart Cards" Journal of Cryptology 4, 3, pp. 161-174.

S. Seo; et al (2013) "Elliptic Curve Cryptography based Certificateless Hybrid Signcryption Scheme without Pairing." Technical Report.

J. Won; et al (2017) "Certificateless Cryptographic Protocols for Efficient Drone-Based Smart City Applications." IEEE Access 5 (2017), pp. 3721-3749.

V. Shoup (2001) "A Proposal for an ISO Standard for Public Key Encryption." IACR Cryptology ePrint Archive 2001 (2001), 112.

A. Shamir (1985) "Identity-Based Cryptosystems and Signature Schemes." In Advances in Cryptology, George Robert Blakley and David Chaum (Eds.). Springer Berlin Heidelberg, Berlin, Heidelberg, pp. 47-53.

* cited by examiner

Algorithm 1 Identity-Based Cryptosystem $(msk, params) \leftarrow$ System.Setup($1^\kappa$):

1: Given the security parameter $1^\kappa$, select primes $p$ and $q$ and $(k, t)$ as in Definition 3.2.
2: for $i = 1, \ldots, t$ do
3:      $v_i \xleftarrow{\$} \mathbb{Z}_q$, $V_i \leftarrow v_i P \bmod p$
4: return $msk \leftarrow (v_1, \ldots, v_t)$, $mpk \leftarrow (V_1, \ldots, V_t)$ and $params \leftarrow (p, q, k, t, mpk)$ $(x, Q) \leftarrow$ Extract($params, ID$):

1: $\beta \xleftarrow{\$} \mathbb{Z}_q$, $Q \leftarrow \beta P \bmod p$
2: For a given $ID$, $(j_1, \ldots, j_k) \leftarrow H(ID, Q)$ where for all $i = 1, \ldots, t$, $1 < j_i < |t|$
3: $y \leftarrow \sum_{i=1}^{k} v_{j_i} \bmod q$
4: $x \leftarrow y + \beta \bmod q$
5: return $(x, Q)$

*FIG. 2*

Key Exchange: Executed online between Node A and Node B with identities $ID_a$ and $ID_b$, respectively.

| Node A    (xa,Qa) | Node B |
|---|---|

$$z_a \xleftarrow{\$} \mathbb{Z}_q^*$$
$$M_a \leftarrow z_a P \bmod p$$

$$z_b \xleftarrow{\$} \mathbb{Z}_q^*$$
$$M_b \leftarrow z_b P \bmod p$$

$\xrightarrow{M_a, Q_a}$
$\xleftarrow{M_b, Q_b}$ $(j_1, \ldots, j_k) \leftarrow H(ID_b, Q_b)$    $(j_1, \ldots, j_k) \leftarrow H(ID_a, Q_a)$ $Y_b \leftarrow \sum_{i=1}^{k} V_{j_i} \bmod p$    $Y_a \leftarrow \sum_{i=1}^{k} V_{j_i} \bmod p$ $K_A \leftarrow x_a(Y_b + Q_b) + z_a M_b \bmod p$    $K_B \leftarrow x_b(Y_a + Q_a) + z_b M_a \bmod p$

*FIG. 3*

Algorithm 2 Certificateless Cryptosystem $(msk, params) \leftarrow \text{System.Setup}(1^\kappa):$ 1: Given the security parameter $1^\kappa$, select primes $p$ and $q$ and $(k, t)$ as in Definition 3.2.
2: for $i = 1, \ldots, t$ do
3: $\quad v_i \xleftarrow{\$} \mathbb{Z}_q, V_i \leftarrow v_i P \bmod p$
4: return $msk \leftarrow (v_1, \ldots, v_t)$, $mpk \leftarrow (V_1, \ldots, V_t)$ and $params \leftarrow (p, q, k, t, mpk)$ $(\alpha, U) \leftarrow \text{User.Setup}(params):$ 1: $\alpha \leftarrow \mathbb{Z}_q$
2: $U \leftarrow \alpha P \bmod p$
3: return $\alpha$ and $U$ $(w, Q) \leftarrow \text{Interim.Key}(params, ID, U):$ 1: $\beta \xleftarrow{\$} \mathbb{Z}_q, W \leftarrow \beta P \bmod p$
2: $Q = U + W \bmod p$
3: $(j_1, \ldots, j_k) \leftarrow H(ID, Q)$ where for all $i = 1, \ldots, t$, $1 < j_i < |t|$
4: $y \leftarrow \sum_{i=1}^{k} v_{j_i} \bmod q$
5: $w \leftarrow y + \beta \bmod q$
6: return $(w, Q)$ $x \leftarrow \text{User.KeyGen}(params, \alpha, w):$ 1: $x \leftarrow w + \alpha \bmod q$
2: return $x$

*FIG. 4*

Key Exchange: Executed online between $ID_a$ and $ID_b$ in $G$:

| Node A | | Node B |
|---|---|---|
| $z_a \xleftarrow{\$} \mathbb{Z}_q^*$ | | $z_b \xleftarrow{\$} \mathbb{Z}_q^*$ |
| $M_a \leftarrow z_a P \bmod p$ | | $M_b \leftarrow z_b P \bmod p$ |
| | $\xrightarrow{M_a, Q_a}$ | |
| | $\xleftarrow{M_b, Q_b}$ | |
| $(j_1, \ldots, j_k) \leftarrow H(ID_b, Q_b)$ | | $(j_1, \ldots, j_k) \leftarrow H(ID_a, Q_a)$ |
| $Y_b \leftarrow \sum_{i=1}^{k} V_{j_i} \bmod p$ | | $Y_a \leftarrow \sum_{i=1}^{k} V_{j_i} \bmod p$ |
| $K_A \leftarrow x_a(Y_b + Q_b) +$ | | $K_B \leftarrow x_b(Y_a + Q_a) +$ |
| $z_a M_b \bmod p$ | | $z_b M_a \bmod p$ |

FIG. 5

Algorithm 3 Certificateless Encryption $(x, Q) \leftarrow \text{KeyGen}(1^\kappa)$:
1: $(msk, params) \leftarrow \text{System.Setup}(1^\kappa)$
2: $(\alpha, U) \leftarrow \text{User.Setup}(params)$
3: $(w, Q) \leftarrow \text{Extract}(params, ID, U)$
4: $x \leftarrow \text{User.KeyGen}(params, \alpha, w)$
5: return $(x, Q)$ $(c, d, C_a) \leftarrow \text{Encrypt}(m, x_a, Q_a, Q_b, ID_b)$: $ID_a$ encrypts message $m$ using the public key of $ID_b$ as follows 1: $z_a \xleftarrow{\$} \mathbb{Z}_q^*, M_a \leftarrow z_a P \bmod p$
2: $(j_1, \ldots, j_k) \leftarrow H(ID_b, Q_b)$
3: $Y_b \leftarrow \sum_{i=1}^{k} V_{j_i} \bmod p$
4: Shared Secret $SS \leftarrow z_a(Y_b + Q_b) \bmod P$
5: $(k_{enc}, k_{MAC}) \leftarrow \text{KDF}(S)$
6: $c \leftarrow \mathcal{E}_{k_{enc}}(m)$
7: $d \leftarrow \text{MAC}_{k_{MAC}}(c)$
8: return $(c, d, M_a)$ $m \leftarrow \text{Decrypt}(x_b, Q_a, (c, d, C_a))$: $ID_b$ decrypts the message with its private key as follows 1: $(j_1, \ldots, j_k) \leftarrow H(ID_a, Q_a)$
2: $Y_a \leftarrow \sum_{i=1}^{k} V_{j_i} \bmod p$
3: $SS' \leftarrow x_b M_a \bmod P$
4: $(k_{enc}, k_{MAC}) \leftarrow \text{KDF}(SS')$
5: If $d \neq \text{MAC}_{k_{MAC}}(c)$ return *invalid*
6: $m \leftarrow \mathcal{D}_{k_{enc}}(c)$
7: return $m$

*FIG. 6*

Algorithm 4 Certificateless Digital Signature $(x, Q) \leftarrow \mathsf{KeyGen}(1^\kappa)$:

1: $(msk, params) \leftarrow \mathsf{System.Setup}(1^\kappa)$
2: $(\alpha, U) \leftarrow \mathsf{User.Setup}(params)$
3: $(w, Q) \leftarrow \mathsf{Extract}(params, ID, U)$
4: $x \leftarrow \mathsf{User.KeyGen}(params, \alpha, w)$
5: return $(x, Q)$ $(s, e) \leftarrow \mathsf{Sign}(m, x_a)$: $ID_a$ signs message $m$ using its private key as follows 1: $z \xleftarrow{\$} \mathbb{Z}_q^*, M \leftarrow z_a P \bmod p$
2: $e \leftarrow H(m, M)$
3: $s \leftarrow z - e \cdot x_a \bmod q$
4: return $(s, e)$ $\{0, 1\} \leftarrow \mathsf{Verify}(m, Q_a, \langle s, e \rangle)$: Other parties verify the signature with the public key of $ID_a$ as follows 1: $(j_1, \ldots, j_k) \leftarrow H(ID_a, Q_a)$
2: $Y_a \leftarrow \sum_{i=1}^{k} V_{j_i} \bmod p$
3: $M' \leftarrow sG + e(Y_a + Q_a) \bmod p$
4: if $e == H(m, M')$ then return 1 (valid)
5: else return 0 (invalid)

*FIG. 7*

EFFICIENT IDENTITY-BASED AND CERTIFICATELESS CRYPTOSYSTEMS

BACKGROUND

In traditional public key settings, to thwart man-in-the-middle attacks, certificates are issued on user-generated public keys to ensure authenticity. However, the infrastructure needed to issue and manage certificates has shown to be very costly to establish and maintain. More importantly, the need to obtain and verify certificates (or certificate chains) can incur substantial computational overhead. For instance, certificate authorities must maintain active or expired certificates, issue new certificates, and verify certificates. While computational overhead in issuing, maintaining, and verifying certificates might be tolerable for certain hardware, it can be non-ideal for internet-of-things (IoT) devices where heterogeneous low-end devices need to communicate securely with minimal use of computational resources.

FIELD OF THE INVENTION

The present disclosure relates to cryptography, network security, and, more specifically, to certificateless cryptosystems.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIG. 2 is an example of a first algorithm for implementation of an identity-based cryptosystem according to various embodiments of the present disclosure.

FIG. 3 is an example of a key exchange executed online between a first client device and a second client device according to various embodiments of the present disclosure.

FIG. 4 is an example of a second algorithm for implementation of a certificateless cryptosystem according to various embodiments of the present disclosure.

FIG. 5 is an example of a key exchange executed online between a first client device and a second client device according to various embodiments of the present disclosure.

FIG. 6 is an example of a third algorithm for implementation of certificateless encryption according to various embodiments of the present disclosure.

FIG. 7 is an example of a fourth algorithm for implementation of certificateless digital signature according to various embodiments of the present disclosure.

DETAILED DESCRIPTION

Figure 1:
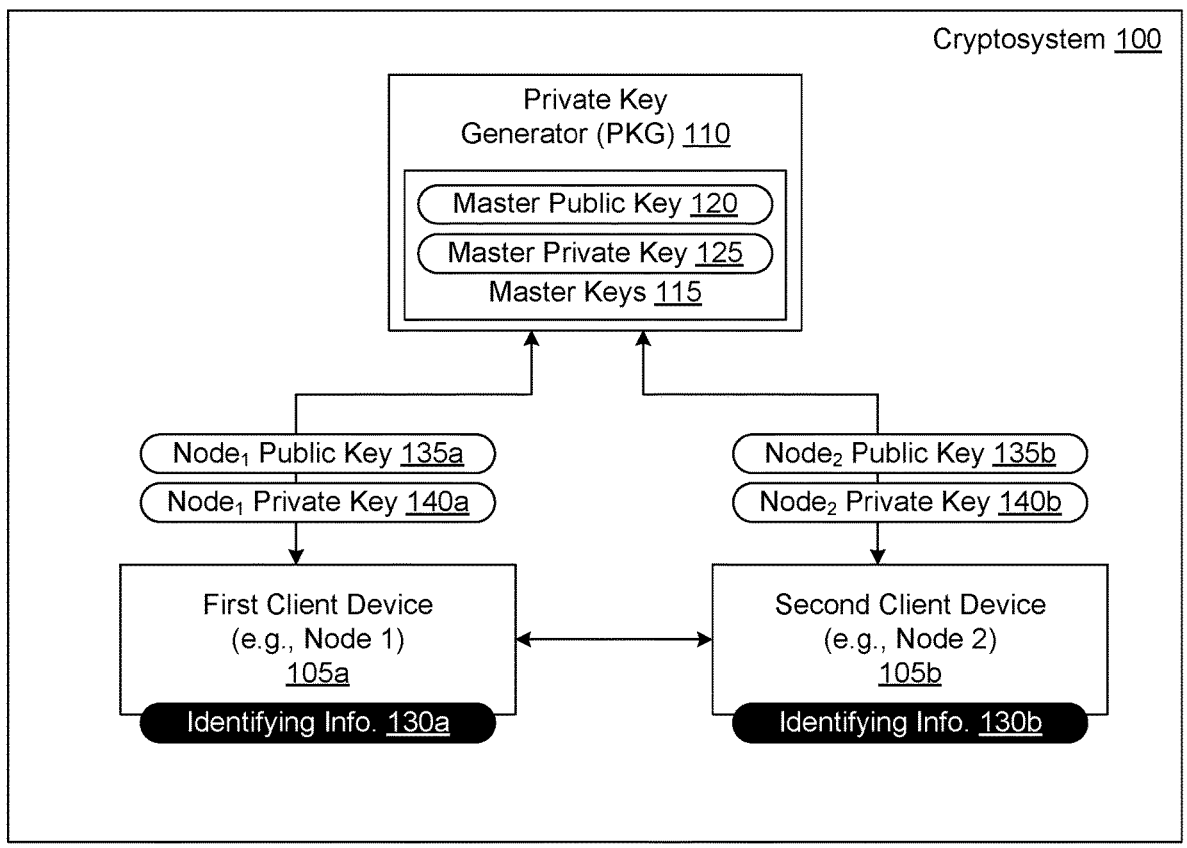
FIG. 1 is a drawing of a networked environment having a cryptosystem according to various embodiments of the present disclosure.

The present disclosure relates to certificate-free, identity-based cryptosystems that offer substantial improvements in communication and computational efficiency over other certificate-based and certificateless techniques in the field. In this regard, a message encoding technique and an exponent product of powers property are employed to provide implicit certification more efficiently than past techniques. To illustrate adoption of the identity-based system, a key exchange protocol is provided that is significantly more efficient than the state-of-the-art, while offering the same communication overhead. Accordingly, various embodiments and applications of the certificateless system are described herein through discussion of a key exchange protocol, an encryption scheme, and a signature scheme example. The certificateless key exchange protocol is more efficient than existing techniques, while the encryption and signature schemes do not introduce any additional overhead as compared to past techniques while, of course, eliminating overhead required for certificate verification.

Symmetric key primitives are known to provide security very efficiently. However, these primitives are not scalable and fail to provide non-repudiation and public verifiability. Public key cryptosystems were introduced to achieve scalability while providing non-repudiation and public verifiability. However, in such systems, the authenticity of users' public keys is derived through certificates issued by a trusted third party, referred to as a certificate authority (CA). Such systems are backed with a public key infrastructure (PKI) in place to issue and manage certificates on users' public keys. However, not only the establishment and the upkeep of this infrastructure is very costly, but PKI also incurs additional communication and computation burdens on the users.

To address the costly generation and management hurdles for certificates, various systems that rely on implicit certification have been proposed. Identity-based cryptography was introduced, which was later made practical through the use of pairing-based tools. In such systems, a public key of a user is derived from identifying information (e.g., a media access control (MAC) address) and the system relies on a trusted third party (TTP), generally referred to as a private key generator (PKG). The private key generator issues users' private keys through implicit certification. However, the key escrow problem exists since the PKG has complete knowledge of the users' private keys. Therefore, the application of such cryptosystems is limited to settings where a trusted authority is in control and manages the whole system (e.g., energy delivery systems).

To circumvent the key escrow problem known in the field, certificateless and certificate-based systems were proposed. In these systems, the private key of the user consists of two parts, one generated by a TTP called the key generation center (KGC), and the other by the users themselves. Aside from the introduced performance bottlenecks, having two different private keys has caused a number of controversies when designing the security models of these systems.

The foregoing systems can be generalized as certificate-free systems as they do not rely on explicit certificates to deliver the authenticity of the users' public keys. Most of the initial certificate-free systems rely on pairing-based techniques that are magnitudes of times slower than the exponentiation operations in traditional settings. Therefore, the trend of using certificate-free systems without pairing was started; however, almost all of the schemes incur expensive computations on the users' side, limiting their adoption in application domains with limited communication bandwidth and/or computational resources.

Accordingly, various embodiments of the present disclosure provide certificate-free cryptosystems that achieve significant computational and communication efficiency as compared to the prior systems. More specifically, an identity-based cryptosystem is described that achieves significant computational efficiency as compared to existing techniques for all the devices involved (e.g., a sending computing device, a receiving computing device, and a private key generator) while enjoying near optimal communications as well as a certificateless cryptosystem which, aside from being both more efficient in computations and communications than previous techniques, has a very simple key update structure that addresses the private key escrow problem. A key generation center (KGC) in the system described herein has the same level of trust as the CA in traditional PKI.

As such, a key exchange protocol is provided herein for various cryptosystems as well as a signature scheme and an encryption scheme using the certificateless cryptosystem described herein. As can be appreciated, the cryptosystems describe herein can be directly adopted in application domains where the TTP is assumed to have authority over users (e.g., transportation, energy delivery systems, healthcare, private blockchain applications, etc.). It is further noted that the two schemes are completely compatible, allowing computing devices in a system that adopt either of the proposed schemes to communicate without any additional overhead.

According to various embodiments, one or more computing devices, such as one or more servers, are described that acts as a private key generator. The computing device may include program instructions stored in memory and executable in the computing device that, when executed, direct the at least one computing device to generate a master public key and a master private key unique to a private key generator; receive identifying information for at least one client device; generate a public key for the at least one client device; generate a private key for the at least one client device by: performing a hash of the identifying information using the public key generated for the at least one client device to generate a plurality of indices; identifying values corresponding to the indices from the master private key; and deriving the private key based at least in part on a summation of the values corresponding to the indices; and send the public key and the private key to the at least one client device.

In some embodiments, the computing device can generate the public key for the at least one client device as a function of: a group of points on a curve for a first prime number p and a pseudorandom number selected from a cyclic group whose order is a second prime number q. Further, in some embodiments, the public key can be generated by multiplying the group of points on the curve for the first prime number p and the pseudorandom number selected from the cyclic group whose order is the second prime number q.

The at least one client device can be a first client device (also referred to as a first node) and a second client device (also referred to as a second node). The cryptosystem can further include the first client device and the second client device. A public key and a private key can be generated for each of the first client device and the second client device.

In some embodiments, each of the first client device and the second client device comprise program instructions executable thereon that, when executed, direct the first client device or the second client device to: generate a random value; generate an ephemeral key value M based at least in part on the random value; send, by the first client device, the ephemeral key value M determined on the first client device and the public key generated for the first client device to the second client device; and send, by the second client device, the ephemeral key value M determined on the second client device and the public key generated for the second client device to the first client device.

In some embodiments, the first client device can be further directed to decrypt, by the first client device, a message received from the second client device, where the message is decrypted using the ephemeral key value M determined on the second client device, the public key generated for the second client device, and the second identifier associated with the second client device. Similarly, in some embodiments, the second client device can be further directed to decrypt, by the second client device, a message received from the first client device, the message decrypted using the ephemeral key value M determined on the first client device, the public key generated for the first client device, and the first identifier associated with the first client device. The first identifier or the second identifier can include an email address, a MAC address, a hardware identifier, or other identifier information as can be appreciated.

In further embodiments, the at least one client device is a first client device and a second client device, where at least the first client device comprises program instructions executable thereon that, when executed, directs the first client device to digitally sign a message using the private key without a certificate; and send the message to the second client device, where the second client device is configured to decrypt the message using the public key generated for the first client device.

In the following discussion, a general description of an identity-based cryptosystem and its components is provided, followed by a discussion of the operation of the same.

FIG. 1 shows an example cryptosystem 100 for efficient identity-based and certificateless communications according to various embodiment. It is understood that the cryptosystem 100 can be a portion of a content distribution system that interacts over a network, such as the Internet. As such, the cryptosystem 100 can include one or more server computing devices coupled across a network to any number of client devices 105a, 105b. In some embodiments, one or more of the servers include a private key generator 110.

The cryptosystem 100 can include a networked environment according to various embodiments. The networked environment includes the client devices 105, the private key generator 110, as well as other computing devices, which are in data communication with each other via a network. The network includes, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks.

The computing environment 103 may comprise, for example, a server computer or any other system providing computing capability. Alternatively, the computing environment 103 may employ a plurality of computing devices that may be arranged, for example, in one or more server banks or computer banks or other arrangements. Such computing devices may be located in a single installation or may be distributed among many different geographical locations. For example, the computing environment 103 may include a plurality of computing devices that together may comprise a hosted computing resource, a grid computing resource and/or any other distributed computing arrangement. In some cases, the computing environment 103 may correspond to an elastic computing resource where the allotted capacity of processing, network, storage, or other computing-related resources may vary over time.

The client devices 105 are representative of a plurality of client devices 105 that may be coupled to the network in the cryptosystem 100. The client devices 105 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, IoT devices, or other devices with like capability. The client devices 105 may include a display. The display may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

Next, a general description of the operation of the various components of the cryptosystem 100 is provided. To begin, the private key generator 110 can generate master keys 115, such as a master public key 120 and the master private key 125. Additionally, the private key generator 110 can receive identifying information 130*a*, 130*b* for a client device 105. Identifying information 130 can include information that uniquely identifies a client device 105 in some embodiments. As such, in various embodiments, the identifying information 130 can include an email address, a MAC address, or other suitable identifier.

The private key generator 110 can generate a public key 135*a*, 135*b* and a private key 140*a*, 140*b* for one or more client devices 105 using identifying information 130 associated with respective ones of the client devices 105. In some embodiments, the public key 135 can be generated for the client device 105 as a function of a group of points on a curve for a first prime number p and a pseudorandom number selected from a cyclic group whose order is a second prime number q. Additionally, the public key 135 can be generated by multiplying the group of points on the curve for the first prime number p and the pseudorandom number selected from the cyclic group whose order is the second prime number q, as will be discussed. The private key generator 110 can send the public key 135 and the private key 140 generated for respective client devices 105 to the client devices 105, for instance, as a public-private key pair.

The client devices 105 can verify and authenticate digitally signed content embedded in data packets received over the network. The private key generator 110 and the client computing devices 105 can include one or more respective processors coupled to a respective memory device or system memory. The system memory can include computer-program modules and program instructions executable by the hardware processors. For instance, a hardware processor fetches and executes program instructions from respective ones of the program modules, libraries, or routines.

The identity-based cryptosystem 100, unlike existing pairing-free systems, does not directly use classic signatures to achieve implicit certification. Instead, it leverages the exponent product of powers property and message encoding to achieve implicit certification more efficiently than existing techniques. More specifically, in the identity-based cryptosystem 100 described herein, the efficiency is obtained by reducing use of scalar multiplication (e.g., scalar multiplication of points on a curve) to simple point addition, which translates to more efficient private key computations on the private key generator 110 (e.g., server) and also significant efficiency gains on the client devices 105. Despite gaining this efficiency, communication overhead remains the same with existing identity-based key exchange protocols.

Also, a certificateless cryptosystem 100 that is very efficient on the key generation center (e.g., private key generator 110 or other server) and on the client devices 105 is proposed. Similar to the identity-based cryptosystem 100, the private key generation on the key generation center does not make use of classical signatures to achieve implicit certification. Using the method above, in the systems described herein, the public key generation can be done very efficiently on a sender or a verifier's client device 105 by using a hash routine and a fixed number of point additions. Note that this highly reduces the key generation overhead on the third party, such as the certificate authority or a server.

Moreover, in some embodiments, a binding technique can be employed to achieve the same level of trust on the key generation center in the cryptosystem 100 as a central authority in traditional PKI. The cryptosystem 100 described herein harnesses the exponent product of powers property to generate a single key for client devices 105 (as opposed to having two keys in most of the existing certificateless systems), and therefore, improve the efficiency of the scheme. Moreover, the key structure of the system described herein is very similar to those in traditional PKI. This is shown by presenting an encryption scheme and a signature scheme that adopt the keys of the certificateless system.

The proposed cryptosystems can enable a seamless interaction between applications that set up with the identity-based setting and those with the certificateless setting. More specifically, using the cryptosystems described herein, identity-based keys for a group of users (where the TTP acts as the private key generator 110) and certificateless keys for another group of client devices 105 in the same system (the third party is not fully-trusted) can be employed, and users (or their client devices 105) are able to communicate seamlessly without any additional overhead. No existing identity-based and certificateless schemes can directly provide this compatibility feature.

Potential Applications and Use-Cases.

Internet-of-Things (IoT) devices consist of a large number of heterogeneous devices which need to provide reliable services, while having limited computing resources. The systems described herein significantly reduce device overhead and, therefore, can be adopted in applications that require minimum-delay requirement that cannot tolerate the overhead introduced by traditional PKI. Another more specific application of the cryptosystems 100 described herein includes energy delivery systems where a vast number of low-end devices (e.g., phasor measurement units) send authenticated and encrypted measurements and receive signals from a power center. The systems can be deployed to achieve the integrity, confidentially, and availability that is provided by the public key cryptosystems with a much lower cost. In these systems, the devices can be easily pre-installed with their private key, and since the power center is fully trusted and has authority in such settings, it can assume the functions of the private key generator 110, as will be described.

The certificateless cryptosystem 100 described herein provides the same efficiency while lifting the trust from the third party (e.g., KGC) by allowing a client device 105 to hide its private key from the key generation center. The certificateless system can then be effortlessly replace traditional PKI while being completely compatible with legacy systems. This not only provides better computational and communication efficiency for end-users and their client devices 105, but it will further significantly reduce the upkeep costs that are required by the PKI. Finally, regardless if an application requires the authority of the TTP on the end client devices 105 (i.e., PKG) or not (i.e., KGC), systems that adopt either of the proposed solutions can communicate effortlessly.

Throughout the present disclosure, additive notion is used. Given two primes p and q, a finite field $\mathbb{F}_p$ and a group $\mathbb{Z}q$ are defined. An elliptic curve $E(\mathbb{F}_p)$ over $\mathbb{F}_p$ is utilized. The notation $P \in E(\mathbb{F}_p)$ refers to a generator of the points on the curve. $X \xleftarrow{\$} S$ denotes randomly selecting x from a set S. Scalars are noted as small letters (e.g., x) and points on a curve are noted as capital letters (e.g., P). Tables and/or matrices are notated as bold capital letters (e.g., P). The bit-length of a variable are defined as |x|, i.e., $|x|=\log_2 x$. Scalar and point multiplication is denoted as xP.

The following definitions can be employed according to various embodiments described herein, for instance, in use of generating or using a digital signature.

Definition 3.1.

A signature routine SGN can be a tuple of three algorithms (Kg, Sig, Ver) defined as follows. First, (sk, PK)←SGN.Kg($1^\kappa$) is a key generation routine that can be invoked by the private key generator 110 where, given a security parameter $1^\kappa$, a private/public key pair (sk, PK) is returned. κ out of t selections should be high number to hide private key information. For instance, in some embodiments, κ can be 18, and t can be 1024.

Second, σ←SGN.Kg(m, sk) is a signing routine that takes a message m∈{0,1}* and a private key sk as input, and returns a signature σ. Third, b←SGN.Ver(m,σ,PK) is a verification routine that takes a message m, signature σ, and the public key PK as input. The verification routine returns a bit b, where 1 means the signature is valid and 0 means the signature is invalid.

Definition 3.2.

The ARIS signature routine can be a tuple of three algorithms. First, (sk,PK)←ARIS.Kg($1^\kappa$) is a routine that, given the security parameter κ, selects parameters (t,k) such that $\binom{t}{k} \geq 2^\kappa$ and $z \xleftarrow{\$} \mathbb{Z}q$. The routine instantiates two pseudorandom functions PRF1: $\{0,1\}^* \to \mathbb{Z}q$ and PRF2: $\{0,1\}^* \to \{0,1\}^\kappa$, and three hash functions H1: $\{0,1\}^* \times \mathbb{Z}q \to \{0,1\}^{l_1}$, H2: $E(Fp) \to \{0,1\}^{l_2}$, and H3: $\{0,1\}^* \times \{0,1\}^{l_2} \to \{0,1\}^{l_1}$ for some integers $l_1$ and $l_2$.

First, the routine comprises computing $x_i \leftarrow PRF_1(z,i)$ and $Y_i \leftarrow x_i P$ for i∈{1, ..., t}, and setting $Y \leftarrow \{Y_i\}_{i=1}^t$. Second, the routine comprises computing $r_i \leftarrow PRF_2(z,i)$ and $R_i \leftarrow r_i P$ for i∈{1, ..., t} and setting $R \leftarrow \{R_i\}_{i=1}^t$. Third, the routine comprises outputting pk←Y and sk←(z,R) as the public key and private key, respectively.

σ←ARIS.Sig(m, sk): Given a message m∈{0,1}* to be signed, this routine works as follows. First, the routine comprises computing $(i'_1, \ldots, i'_k) \leftarrow H_1(m,z)$ where $|i'_j| \leq |t|$ for j∈{1, ..., k}. Second, the routine comprises computing $r_{i'} \leftarrow PRF_2(z, i'_j)$ for j∈{1, ..., k} and setting $$r \leftarrow \sum_{i'=1}^{k} r_{i'}.$$

Third, the routine comprises retrieving $R_{i'} \leftarrow R[i'_j]$ for j∈{1, ..., k}, and computing $$R \leftarrow \sum_{i'=1}^{k} R_{i'}$$

and $h \leftarrow H_2(R)$. Fourth, the routine comprises computing $(i_1, \ldots, i_k) \leftarrow H_3(m,h)$ (where $|i_j| \leq |t|$) and $x_i \leftarrow PRF_1(z,i_j)$ for j∈{1, ..., k}. Fifth, the routine comprises $$s \leftarrow r - \sum_{i=1}^{k} x_i$$

and outputting σ←(s,h).

{0, 1}←ARIS.Ver(m,σ,PK): Given a message-signature pair (m,σ) and pk, this routine works as follows. First, the routine parses (s,h)←σ and computes $(i_1, \ldots, i_k) \leftarrow H_3(m,h)$, where $|i_j| \leq |t|$ for j∈{1, ..., k}. Second, the routine retrieves $Y_i \leftarrow Y[i_j]$ for j∈{1, ..., k}) and sets $$Y \leftarrow \sum_{i=1}^{k} Y_i.$$

Third, the routine comprises computing R'←sP+Y and checking if $H_2(R')=h$ holds a valid output, or is otherwise invalid.

Identity-Based Cryptosystem.

Most of the existing identity-based schemes that avoid the expensive pairing computations rely on the design of the classical signatures in their key generation step to provide implicit certification. Since these signature schemes usually require many expensive computations (e.g., scalar multiplication), they incur a non-negligible computation overhead on the users' side while being also costly for the PKG. To address this, a significantly more efficient method for key generation is provided herein that only utilizes a hash routine (or a hash call) and a few point additions. Aside from having a completely different key generation design rationale, significant efficiency on both the side of the private key generator 110 and the client device 105 is achieved. The identity-based cryptosystem 100 described herein and, as a byproduct, a key-exchange protocol, are described in Algorithm 1 shown in FIG. 2 and further explained as follows.

In some embodiments, the ARIS signature can be used to provide authentication. In the cryptosystem 100, when issuing keys, a key generation center gives a signature as a private key to the users in the cryptosystem 100. When the users use the private keys to communicate with one another in the cryptosystem 100, for instance, by the key generation center, just owning the certain type of private key will authenticate themselves using the public key available to all client devices 105 in the cryptosystem 100.

Referring to FIG. 2, a System.Setup(•) routine and an Extract(•) routine as shown, where each can be executed by the private key generator 110. In short, the System.Setup(•) routine can generate a master public key 120 and a master private key 125 for the private key generator 110. Further, the Extract(•) routine can generate a public key 135 and a private key 140 for one or more client devices 105 using identifying information 130 associated with respective ones of the client devices 105.

Referring first to the System.Setup(•) routine, in Steps 1-3, for each value of t (e.g., t=1024), the private key generator 110 selects random numbers $v_i$ and computes $V_i \leftarrow v_i P \mod p$, for i=1, . . . , t. One can note that this is very similar to techniques where scalar multiplication is treated as the one-way function. In Step 4, the routine then sets the master private key 125 (or "master secret key" denoted "msk") msk$\leftarrow(v_1, \ldots, v_t)$ and the master public key 120 (denoted "mpk") mpk$\leftarrow V_1, \ldots, V_t$, where the master public key 120 is available to all devices in the cryptosystem 100. Also, the routine can return various parameters, such as values for p, q, k, t, and the master private key 125 (mpk).

As noted above, the Extract(•) routine can generate a public key 135 and a private key 140 for one or more client devices 105 using identifying information 130 associated with respective ones of the client devices 105. In the Extract(•) routine (also shown in FIG. 2), in Step 1, the private key generator 110 selects a randomness $\beta \leftarrow \mathbb{Z}q$ and computes a public key Q, using $Q \leftarrow \beta P \mod p$. It is ideal to use a fresh random number for each key generated. Note that this randomness is used to prevent any leakage of the master private key 125 in the process of key generation. Thereafter, the private key generator 110 uses a publicly defined hash function (H) H: $\{0,1\}^* \times \in (\mathbb{F}_p) \rightarrow \{0,1\}^{k|t|}$ to compute indexes (or "indices") $(j_1, \ldots, j_k) \leftarrow H(ID,Q)$, where "ID" refers to an identifier or other identifying information 130, which are used to retrieve corresponding elements of the master secret key $v_{j_i}$ f or i={1, . . . , k}. The indices correspond to values $(v_i)$ to be selected from the master private key 125. These values are obtained and added in Step 3. Step 4 includes adding the random number β mod q and the value y to generate the private key 140. Ultimately, the routine returns a private key 140 (x) and a public key 135 for a client device 105. It is understood that this routine can be executed for each client device 105 in the cryptosystem 100.

Moving on to FIG. 3, an ephemeral key exchange protocol is shown, where the nodes can include two client devices 105 or other computing devices. In some embodiments, the nodes include IoT devices. Through this key exchange protocol, a random number is used to derive a new ephemeral private key. For instance, if the key exchange protocol is executed twice, the private key generated would be different in each instance based on a new pseudorandom values, $z_a$ and $z_b$. For instance, the first client device 105 generates a first pseudorandom value $z_a$ and the second client device 105 generates a second pseudorandom value $z_b$.

In the key exchange protocol of the cryptosystem 100 described herein, first, each client device 105 computes a respective commitment value M (also known as a public ephemeral value), and sends the commitment value M along with a public key Q to the other party. Using Q and the publicly available identity (ID), each client device 105 computes the corresponding public key 135 of its correspondence Y. The shared-key is then calculated securely to avoid attacks vulnerable to past techniques in the field. Note that the key exchange requires one less exponentiation on each side, which translates to roughly 24% more efficiency as compared to one of the most efficient instances of these protocols.

After $(M_a, Q_a)$ and $(M_b, Q_b)$ are exchanged, the respective client devices 105 perform a hash of the identifying information 130 of the other client device 105 to derive the same indices identified in the Extract(•) routine, described above. These indices are used to add the same V values in the master public key to derive the corresponding value for y. Using $Y_b$, operations are conducted to generate shared keys $K_A$ and $K_B$, where $Y_b = y_b \times p$. The final keys $K_A$ and $K_B$ can be used in symmetric key encryption, for instance, to encrypt or decrypt messages received from the other client device 105, as can be appreciated.

Certificateless Cryptosystem.

Certificateless cryptosystems were proposed to address the private key escrow problem in the identity-based systems. In some techniques, the private key of the users in the systems consisted of two parts, one computed by the KGC, similar to that of the identity-based systems and the second part computed by the user, independent of the KGC. Similar to identity-based systems, early certificateless systems, require expensive pairing evaluations which highly limited their adoption on devices having minimal computing resources. Later, pairing-free solutions were proposed; however, due to their underlying components, such systems also incurred expensive computations both on the users and the KGC. Using the identity-based system proposed in Algorithm 1, a certificateless cryptosystem 100 is provided which offers numerous advantages as compared to previous techniques. The certificateless cryptosystem 100 described herein and the resulting key-exchange protocol, encryption scheme, and a signature scheme are described in Algorithms 2, 3, and 4, shown in FIGS. 4, 6, and 7 respectively, and further explained as follows.

Referring now to FIG. 4, the System.Setup(•)routine in Algorithm 2 is somewhat similar to that of Algorithm 1. However, in the User.Setup(•) algorithm, the user generates an intermediate key pair (α, U) where U will be passed to the private key generator 110 and a will remain a secret (e.g., for deletion at the end of the routine or other key generation protocol). In the Interim.Key(•) routine, the KGC selects $\beta\$ \leftarrow \mathbb{Z}q$ as the masking term and computes $W \leftarrow \beta P \mod p$. It then uses the value of U, provided by the client device 105, to compute Q and proceed similar as the Extract(•) in Algorithm 1, for instance, to compute the pair (w,Q), where w is treated as the interim private key of the user. In the User.KeyGen(•) algorithm, the user uses α and w (received from the KGC) to compute its final private key x. Therefore, the certificateless system described herein harnesses the exponent product of powers property to enable both the key generation center and the client device 105 to use their own masking terms (i.e., α and β) to compute a final private key 140, while still maintaining the implicit certification property of certificateless systems.

Public Key Encryption.

A certificateless public key encryption scheme is now described, that is a variation of a standardized Elliptic Curve Integrated Encryption Scheme (ECIES), which leverages the certificateless key exchange algorithm described in Algorithm 2. Referring now to FIG. 6, a public key encryption routine is presented in Algorithm 3, that invokes the necessary functions from Algorithm 2. Specifically, at the key generation of the encryption protocol, client devices 105 derive their keys interacting with the key generation center, which provides the certificateless nature of the encryption protocol. These keys can be used to encrypt or decrypt a message as follows. First, a first client device 105 (i.e., a sender having $ID_a$ in Algorithm 3) generates a pair $z_a$, $M_a$, $=z_a P \mod p$ as a fresh randomness, and, similar to the key exchange protocol, calculates the aggregated ephemeral public key $C_a$. As in the ECIES protocol, the first client device 105 knows the public key 135 of the receiver (e.g., a second client device 105) to start the protocol. At Step 3, the first client device 105 uses this information to derive indices and the public key $Y_b$. Then, the shared secret is calculated similar to or in accordance with the ephemeral key exchange algorithm, where $Q_b$ can be used instead of $C_b$, for instance, to avoid an interactive encryption protocol.

Finally, encryption and authentication keys are derived from the shared secret that are used to encrypt the message and generate an authentication tag. At the decryption algorithm, the receiver should derive the same shared secret to check the validity of the authentication tag and decrypt the message. To do so, the receiver can first derive the public key $Y_a$ in Steps 1-2. Then, the shared secret can be calculated using their private key $x_b$, public key of the sender $Y_a$, and the ephemeral public key of the sender $C_a$. Note that this value is the same as the one in encryption protocol since $z_a(Y_b+Q_b)$ mod $p=z_a(y+\alpha_b+\beta)P$ mod $p=z_ax_bP$ mod $p=x_bM_a$ mod p. Then, the verifier uses this shared secret to derive the same keys as the sender, checks the validity of the authentication tag, and decrypts the message.

Digital Signature.

Similar to the public key encryption scheme described herein, the key generated in step 2 can be used to derive a certificateless signature scheme as presented in Algorithm 4, shown in FIG. 7. The proposed scheme is a variant of the Schnorr signature. Note that, in the Verify(•) algorithm, the verify routine derives the public key 135 of the signer by only a hash call and k point additions. This is significantly more efficient that verifying a certificate (or certificate chain), which translates into a number of fixed-point scalar multiplications.

Figure 8:
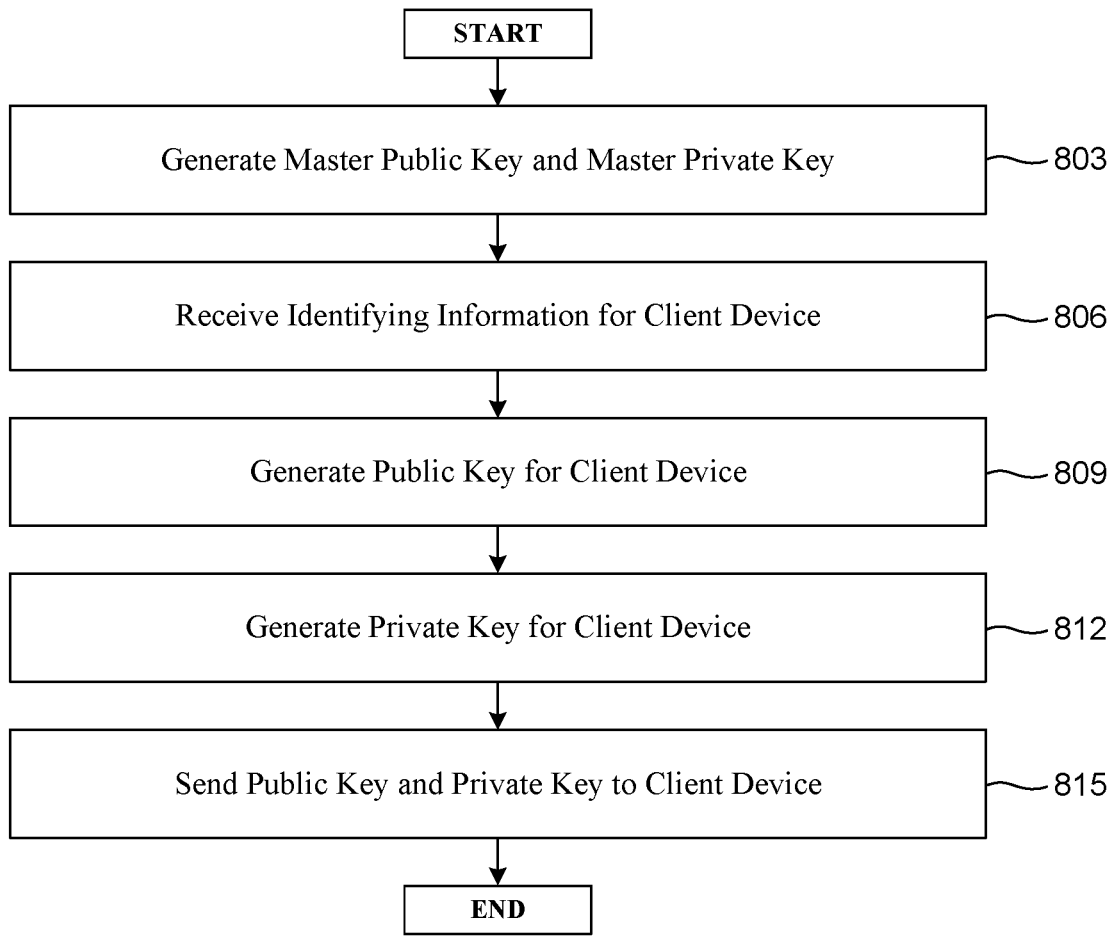
FIGS. 8-9 are flowcharts illustrating example functionality implemented as portions of a computing device or client device in the cryptosystem of the networked environment of FIG. 1 according to various embodiments of the present disclosure.

Referring next to FIG. 8, shown is a flowchart that provides one example of the operation of a portion of the cryptosystem 100 according to various embodiments. It is understood that the flowchart of FIG. 8 provides merely an example of the many different types of functional arrangements that may be employed to implement the operation of the portion of the cryptosystem 100 as described herein. As an alternative, the flowchart of FIG. 8 may be viewed as depicting an example of elements of a method implemented in the cryptosystem 100 according to one or more embodiments.

Beginning with step 803, the private key generator 110 can generate a master public key 120 and the master private key 125. In some examples, the private key generator 110 can invoke the System.Setup(•) routine shown in FIG. 2 and Algorithm 1. For instance, in Steps 1-3 of the routine, for each value of t, the private key generator 110 selects random numbers $v_i$ and computes $V_i \leftarrow v_iP$ mod p, for i=1, . . . , t. In Step 4, the routine then sets the master private key 125 msk$\leftarrow(v_1, \ldots, v_t)$ and the master public key 120 (denoted "mpk") mpk$\leftarrow V_1, \ldots, V_t$, where the master public key 120 is available to all devices in the cryptosystem 100. Also, the routine can return various parameters, such as values for p, q, k, and t.

In step 806, the private key generator 110 can receive identifying information 130 for a client device 105. Identifying information 130 can include information that uniquely identifies a client device 105 in some embodiments. As such, in various embodiments, the identifying information 130 can include an email address, a MAC address, or other suitable identifier.

In step 806, the private key generator 110 can generate a public key 135 for the client device 105. In some examples, the private key generator 110 can invoke the Extract(•) routine shown in FIG. 2 and Algorithm 1. The Extract(•) routine can generate a public key 135 and a private key 140 for one or more client devices 105 using identifying information 130 associated with respective ones of the client devices 105.

As shown in Algorithm 2, the public key 135 can be generated for the client device 105 as a function of a group of points on a curve for a first prime number p and a pseudorandom number selected from a cyclic group whose order is a second prime number q. Additionally, the public key 135 can be generated by multiplying the group of points on the curve for the first prime number p and the pseudorandom number selected from the cyclic group whose order is the second prime number q.

In step 809, the private key generator 110 can generate a private key 140 for the client device 105. The generation of the private key 140 is described in greater detail with respect to FIG. 9, as will be discussed.

In step 812, the private key generator 110 can send the public key 135 and the private key 140 generated for the client device 105 to the client device 105, for instance, as a public-private key pair. Thereafter, the process can proceed to completion.

Figure 9:
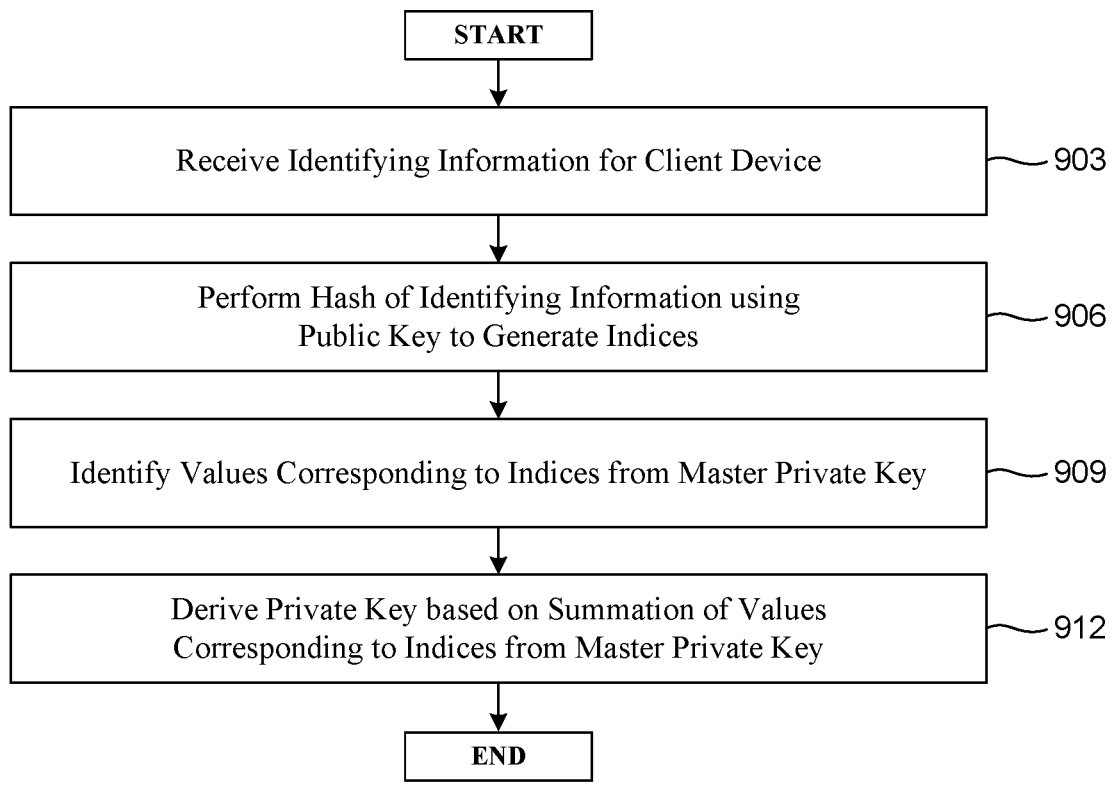

Turning now to FIG. 9, a flowchart is shown that provides one example of the operation of a portion of the cryptosystem 100 according to various embodiments. It is understood that the flowchart of FIG. 9 provides merely an example of the many different types of functional arrangements that may be employed to generate a private key 140 for a client device 105 as described herein. As an alternative, the flowchart of FIG. 9 may be viewed as depicting an example of elements of a method implemented in the cryptosystem 100 according to one or more embodiments.

In step 903, the private key generator 110 can receive identifying information 130 for the client device 105. In step 906, the private key generation 110 can perform a hash of the identifying information 130 using the public key 135 generated for the client device 105 to generate a plurality of indices.

For instance, in the Extract(•)routine, shown in FIG. 2, in Step 2, the private key generator 110 uses a publicly defined hash function (H) H: $\{0,1\}^* \times E(\mathbb{F}_p) \rightarrow \{0,1\}^{k|t|}$ to compute indexes (or "indices") $(j_1, \ldots, j_k) \leftarrow H(ID,Q)$, where "ID" refers to an identifier or other identifying information 130. The indices are used to retrieve corresponding elements of the master secret key $v_{j_i}$ f or i=$\{1, \ldots, k\}$. For instance, the indices correspond to values ($v_i$) to be selected from the master private key 125. These values are obtained and added in Step 3. Step 4 includes adding the random number $\beta$ mod q and the value y to generate the private key 140.

In some embodiments, the hashing routine includes a one-way hash. When hashing identifying information 130 (e.g., a unique identifier) with a public key 135 Q, a string of bits can be generated. The string of bits can be used to divide the hash output by 10 bits or other suitable number of bits. In other words, the string of bits generated includes several 10 bit strings. Each 10 bits can be interpreted as a number from 1-1024, or other suitable range, for example.

Continuing the example above, $J_1$ can be the first 10 bits of the output of the hash routine, and a value (or number) of the private key 140 corresponds to J1. Each of the 10 bits in the hash output provide a number, or an index. The indices can be used to select a private key from a private key pool of t values (e.g., the master private key 125). For instance, if t=1024, 1024 master secret key values have been previously generated. In step 909, k number of these values or indices are identified using the indices from the master private keys 125. These values are then added to generate the private key 140. In other words, the private key 140 is derived based at least in part on a summation of the values corresponding to the indices.

Ultimately, the routine returns a private key 140 (*x*) and a public key 135 for a client device 105. It is understood that this routine can be executed for each client device 105 in the cryptosystem 100. Thereafter, the process can proceed to completion.

Figure 10:
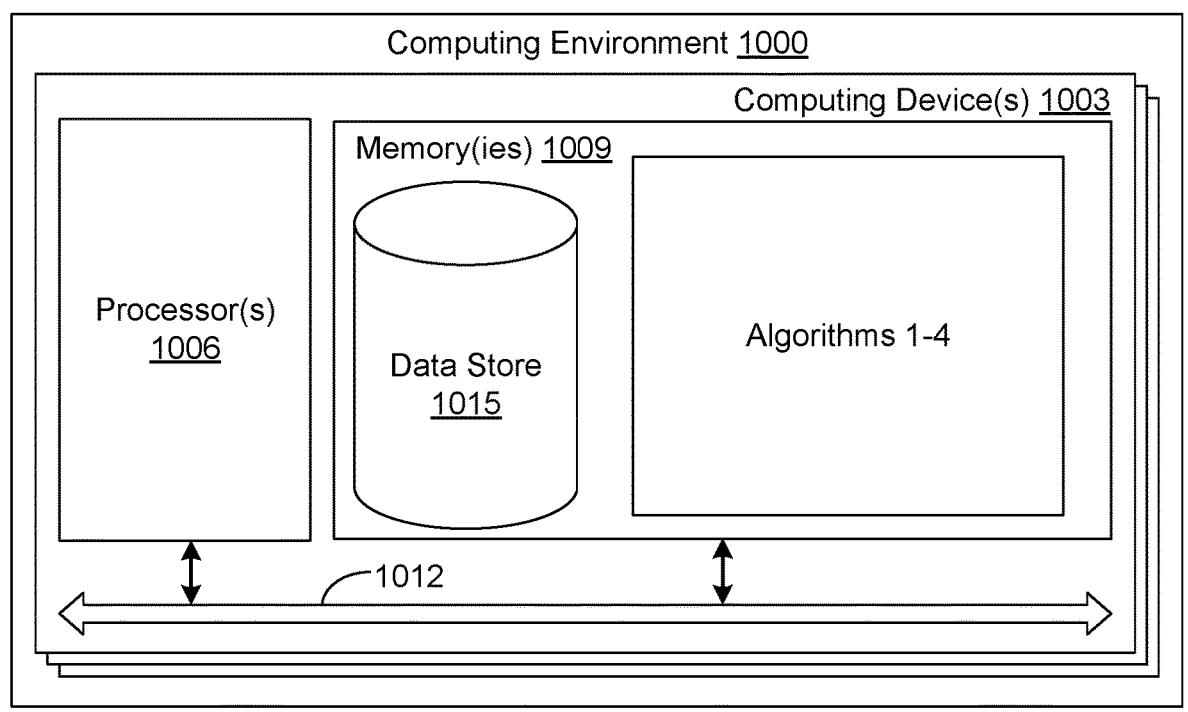
FIG. 10 is a schematic block diagram that provides one example illustration of a computing device or client device employed in the networked environment or cryptosystem of FIG. 1 according to various embodiments of the present disclosure.

With reference to FIG. 10, a schematic block diagram of a computing environment 1000 is shown according to an embodiment of the present disclosure. The computing environment 1000 includes one or more computing devices 1003. The computing devices 1003 can include the client devices 105 and/or the private key generator 110. Each computing device 1003 includes at least one processor circuit, for example, having a processor 1006 and a memory 1009, both of which are coupled to a local interface 1012. To this end, each computing device 1003 may comprise, for example, at least one server computer or like device. The local interface 1012 may comprise, for example, a data bus with an accompanying address/control bus or other bus structure as can be appreciated.

Stored in the memory 1009 are both data and several components that are executable by the processor 1006. In particular, stored in the memory 1009 and executable by the processor 1006 are Algorithms 1-4, and potentially other applications. Also stored in the memory 1009 may be a data store 1015 and other data. In addition, an operating system may be stored in the memory 1009 and executable by the processor 1006.

It is understood that there may be other applications that are stored in the memory 1009 and are executable by the processor 1006 as can be appreciated. Where any component discussed herein is implemented in the form of software, any one of a number of programming languages may be employed such as, for example, C, C++, C #, Objective C, Java®, JavaScript®, Perl, PHP, Visual Basic®, Python®, Ruby, Flash®, or other programming languages.

A number of software components are stored in the memory 1009 and are executable by the processor 1006. In this respect, the term "executable" means a program file that is in a form that can ultimately be run by the processor 1006. Examples of executable programs may be, for example, a compiled program that can be translated into machine code in a format that can be loaded into a random access portion of the memory 1009 and run by the processor 1006, source code that may be expressed in proper format such as object code that is capable of being loaded into a random access portion of the memory 1009 and executed by the processor 1006, or source code that may be interpreted by another executable program to generate instructions in a random access portion of the memory 1009 to be executed by the processor 1006, etc. An executable program may be stored in any portion or component of the memory 1009 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 1009 is defined herein as including both volatile and nonvolatile memory and data storage components. Volatile components are those that do not retain data values upon loss of power. Nonvolatile components are those that retain data upon a loss of power. Thus, the memory 1009 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 1006 may represent multiple processors 1006 and/or multiple processor cores and the memory 1009 may represent multiple memories 1009 that operate in parallel processing circuits, respectively. In such a case, the local interface 1012 may be an appropriate network that facilitates communication between any two of the multiple processors 1006, between any processor 1006 and any of the memories 1009, or between any two of the memories 1009, etc. The local interface 1012 may comprise additional systems designed to coordinate this communication, including, for example, performing load balancing. The processor 1006 may be of electrical or of some other available construction.

Although the cryptosystem 100, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 8 and 9 show the functionality and operation of an implementation of portions of the cryptosystem 100. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 1006 in a computer system or other system. The machine code may be converted from the source code, etc. If embodied in hardware, each block may represent a circuit or a number of interconnected circuits to implement the specified logical function(s).

Although the flowcharts of FIGS. 8 and 9 show a specific order of execution, it is understood that the order of execution may differ from that which is depicted. For example, the order of execution of two or more blocks may be scrambled relative to the order shown. Also, two or more blocks shown in succession in FIGS. 8 and 9 may be executed concurrently or with partial concurrence. Further, in some embodiments, one or more of the blocks shown in FIGS. 8 and 9 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the cryptosystem 100, that comprises software or code can be embodied in any non-transitory computer-readable medium for use by or in connection with an instruction execution system such as, for example, a processor 1006 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 1003, or in multiple computing devices in the same computing environment 103. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. An identity-based cryptosystem, comprising:
at least one computing device; and
program instructions stored in memory and executable in the at least one computing device that, when executed, direct the at least one computing device to:
generate a master public key and a master private key unique to a private key generator (PKG);
receive identifying information for at least one client device;
generate a public key for the at least one client device;
generate a private key for the at least one client device by:
performing a hash of the identifying information using the public key generated for the at least one client device to generate a plurality of indices;
identifying values corresponding to the indices from the master private key; and
deriving the private key based at least in part on a summation of the values corresponding to the indices; and
send the public key and the private key to the at least one client device.

2. The identity-based cryptosystem of claim 1, wherein the public key generated for the at least one client device is generated as a function of: a group of points on a curve for a first prime number p and a pseudorandom number selected from a cyclic group whose order is a second prime number q.

3. The identity-based cryptosystem of claim 2, wherein the public key is generated by multiplying the group of points on the curve for the first prime number p and the pseudorandom number selected from the cyclic group whose order is the second prime number q.

4. The identity-based cryptosystem of claim 1, wherein:
the at least one client device is a first client device and a second client device;
the system further comprises the first client device and the second client device; and
the public key and the private key are generated for each of the first client device and the second client device.

5. The identity-based cryptosystem of claim 4, wherein each of the first client device and the second client device comprise program instructions executable thereon that, when executed, direct the first client device or the second client device to:
generate a random value;
generate an ephemeral key value M based at least in part on the random value;
send, by the first client device, the ephemeral key value M determined on the first client device and the public key generated for the first client device to the second client device; and
send, by the second client device, the ephemeral key value M determined on the second client device and the public key generated for the second client device to the first client device.

6. The identity-based cryptosystem of claim 5, wherein the first client device is further directed to decrypt, by the first client device, a message received from the second client device, the message decrypted using the ephemeral key value M determined on the second client device, the public key generated for the second client device, and a second identifier associated with the second client device.

7. The identity-based cryptosystem of claim 5, wherein the second client device is further directed to decrypt, by the second client device, a message received from the first client device, the message decrypted using the ephemeral key value M determined on the first client device, the public key generated for the first client device, and a first identifier associated with the first client device.

8. The identity-based cryptosystem of claim 5, wherein a first identifier or a second identifier comprises an email address.

9. The identity-based cryptosystem of claim 1, wherein:
the at least one client device is a first client device and a second client device;
at least the first client device comprises program instructions executable thereon that, when executed, directs the first client device to:
digitally sign a message using the private key without a certificate; and
send the message to the second client device, where the second client device is configured to decrypt the message using the public key generated for the first client device.

10. The identity-based cryptosystem of claim 1, wherein the first client device or the second client device implements an Internet-of-Things protocol.

11. A computer-implemented method, comprising:
generating, by at least one computing device comprising at least one hardware processor, a master public key and a master private key unique to a private key generator (PKG);
receiving identifying information for at least one client device;
generating a public key for the at least one client device;
generating a private key for the at least one client device by:
performing a hash of the identifying information using the public key generated for the at least one client device to generate a plurality of indices;
identifying values corresponding to the indices from the master private key; and
deriving the private key based at least in part on a summation of the values corresponding to the indices; and
send the public key and the private key to the at least one client device.

12. The computer-implemented method of claim 11, wherein the public key generated for the at least one client device is generated as a function of: a group of points on a curve for a first prime number p and a pseudorandom number selected from a cyclic group whose order is a second prime number q.

13. The computer-implemented method of claim 12, wherein the public key is generated by multiplying the group of points on the curve for the first prime number p and the pseudorandom number selected from the cyclic group whose order is the second prime number q.

14. The computer-implemented method of claim 11, wherein:
the at least one client device is a first client device and a second client device;
the public key and the private key are generated for each of the first client device and the second client device.

15. The computer-implemented method of claim 14, further comprising:
generating a random value;
generating an ephemeral key value M based at least in part on the random value;
sending, by the first client device, the ephemeral key value M determined on the first client device and the public key generated for the first client device to the second client device; and
sending, by the second client device, the ephemeral key value M determined on the second client device and the public key generated for the second client device to the first client device.

16. The computer-implemented method of claim 15, further comprising decrypting, by the first client device, a message received from the second client device, the message decrypted using the ephemeral key value M determined on the second client device, the public key generated for the second client device, and a second identifier associated with the second client device.

17. The computer-implemented method of claim 15, further comprising decrypting, by the second client device, a message received from the first client device, the message decrypted using the ephemeral key value M determined on the first client device, the public key generated for the first client device, and a first identifier associated with the first client device.

18. The computer-implemented method of claim 15, wherein a first identifier or a second identifier comprises an email address.

19. The computer-implemented method of claim 11, wherein:
the at least one client device is a first client device and a second client device;
the computer-implemented method further comprises:
digitally signing a message using the private key without a certificate; and
sending the message to the second client device, where the second client device is configured to decrypt the message using the public key generated for the first client device.

20. The computer-implemented method of claim 11, wherein the first client device or the second client device implements an Internet-of-Things protocol.

* * * * *

UNITED STATES PATENT AND TRADEMARK OFFICE
CERTIFICATE OF CORRECTION

| | |
|---|---|
| PATENT NO. | : 10,673,625 B1 |
| APPLICATION NO. | : 16/442467 |
| DATED | : June 2, 2020 |
| INVENTOR(S) | : Rouzbeh Behnia, Muslum Ozgur Ozmen and Attila Altay Yavuz |

It is certified that error appears in the above-identified patent and that said Letters Patent is hereby corrected as shown below:

In the Specification

In Column 1, above Line 4 please insert the following paragraph:
-- GOVERNMENT SUPPORT CLAUSE
This invention was made with government support under DE-OE0000780 awarded by the Department of Energy and 1652389 awarded by the National Science Foundation. The government has certain rights in the invention. --

Signed and Sealed this
Fifteenth Day of October, 2024

*Katherine Kelly Vidal*

Katherine Kelly Vidal
*Director of the United States Patent and Trademark Office*